J. PEOPLES, Sr. & W. T. CLARK.
CHOPPER.
APPLICATION FILED APR. 16, 1914.
1,160,955.
Patented Nov. 16, 1915.
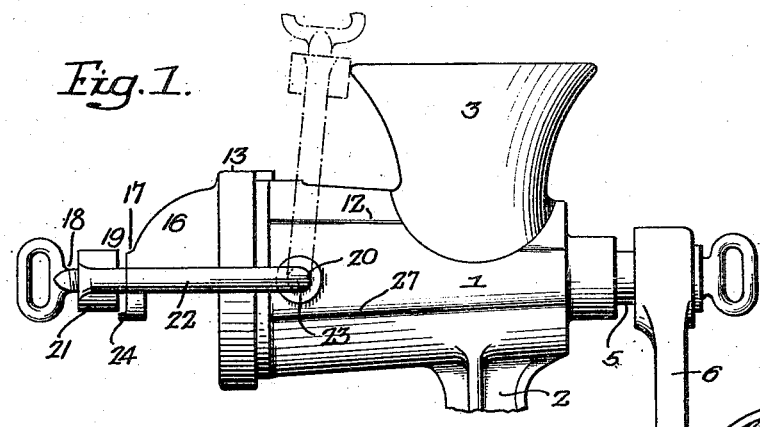
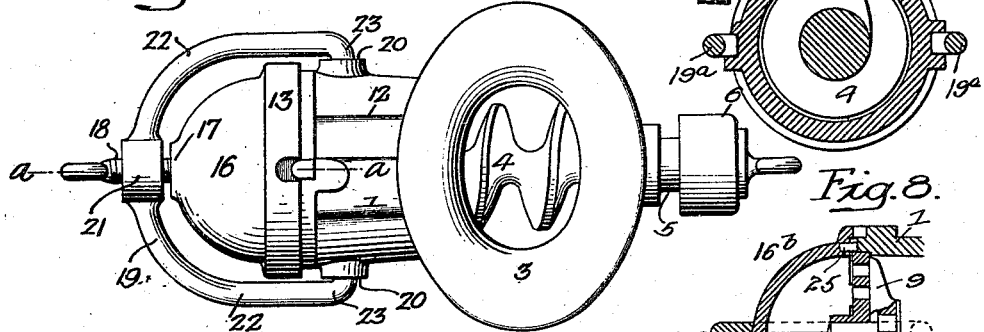
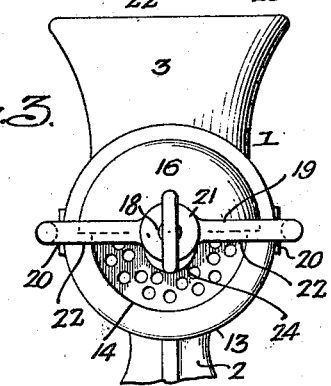
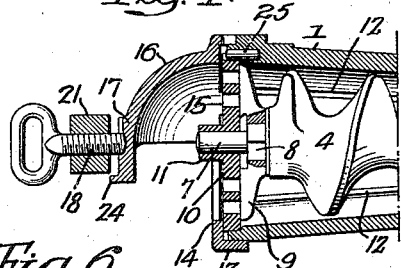
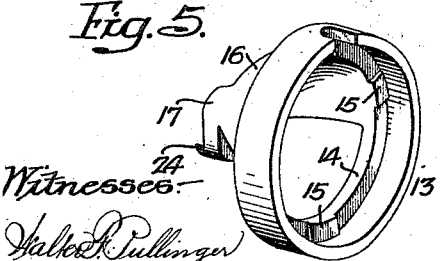
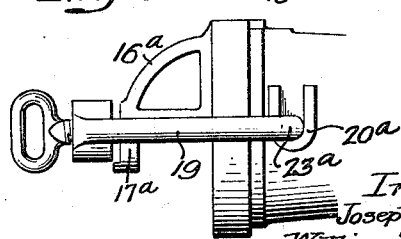
Inventors
Joseph Peoples Sr.
William T. Clark.
by their Attorneys

UNITED STATES PATENT OFFICE.

JOSEPH PEOPLES, SR., AND WILLIAM T. CLARK, OF PHILADELPHIA, PENNSYLVANIA, ASSIGNORS TO THE ENTERPRISE MANUFACTURING COMPANY OF PENNSYLVANIA, OF PHILADELPHIA, PENNSYLVANIA, A CORPORATION OF PENNSYLVANIA.

CHOPPER.

1,160,955. Specification of Letters Patent. Patented Nov. 16, 1915.

Application filed April 16, 1914. Serial No. 832,256.

*To all whom it may concern:*

Be it known that we, JOSEPH PEOPLES, Sr., and WILLIAM T. CLARK, citizens of the United States, residing in Philadelphia, county of Philadelphia, State of Pennsylvania, have invented certain Improvements in Choppers, of which the following is a specification.

Our invention relates to certain improvements in chopping machines of the type in which the material is forced against a perforated plate and the portions projecting into the perforations of the plate are severed by a rotating knife.

One object of our invention is to dispense with the screw threads which are usually employed to attach the holding ring to the casing, as it is found that the meat will work itself into these threads and that these threads are very difficult to clean, so that foul matter is liable to be retained at the base of the threads without a special implement is used when cleaning.

A further object of the invention is to provide a simple and effective device for keeping the plate in proper contact against the knife as the parts wear from use.

A still further object of the invention is to provide a hood for deflecting the material as it is forced through the perforated plate.

Another object of the invention is to make the device detachable so that it can be thoroughly cleansed and quickly replaced.

These objects and other advantageous ends, we attain in the following manner, reference being had to the accompanying drawings, in which:—

Figure 1 is a side view of our improved chopping machine, the support and handle being broken away; Fig. 2, is a plan view; Fig. 3 is an end view; Fig. 4 is a sectional view on the line *a—a*, Fig. 2; Fig. 5, is a perspective view of the hood; and Figs. 6, 7 and 8, are views illustrating modifications of the invention.

Referring to the drawings, 1 is the casing of the chopper having a support 2 which may be arranged so as to be clamped or screwed to a table.

3 is the hopper through which the material is fed to the casing.

4 is a feed screw of the ordinary type having a stem 5 projecting through the rear of the casing, and on the stem is secured a handle 6. The forward end of the screw has a stem 7 having a squared portion 8 on which is mounted the blade 9 provided with one or more knives or blades which bear against a perforated plate 10 having a hub 11 through which extends the stem 7 of the screw and acts as the forward bearing for said screw. The casing has a series of longitudinal ribs 12, of any form desired, which act in conjunction with the screw to feed the material forward and against the perforated plate 10. This is the ordinary form of chopping machine. Usually, the plate is held to the casing by means of a screw cap which has a flange fitting over the plate and also has a threaded portion adapted to an external thread on the casing. The present invention relates to detachable means for holding the plate to the casing, which can be quickly located in place and as quickly removed for cleaning, and which can be taken up as the parts wear and which will direct the material projected from the machine downward into a suitable receptacle. The screw threads located at the plate are objectionable as the material, being forced through the machine, will work its way into the threads of the screw and, without the greatest care is exercised, the material will remain in the threads and decompose. By having a plain cap or ring fitting over the end of the casing, this objection is overcome.

13 is a ring or cap having a flange 14 in line with the outer edge of the perforated plate 10, and on this flange are three lugs 15 which bear directly upon the outer surface of the plate beyond the perforations so as to hold the plate in contact with the cutting blade 9. On the ring 13 is a hood 16 which projects sufficiently in advance of the cutting plate to direct the material downward as it is projected through the plate. On the outer end of this hood is a bearing 17 for a screw 18 which is mounted in a yoke 19 pivoted to the bearings at 20 on the casing 1. In the present instance, the yoke has an enlarged portion 21, forming the support for the screw 18, and arms 22 having ends 23 which project into the recesses in the casing forming the bearings 20 so that, when the screw 18 is backed off, the yoke can be turned to the position illustrated in dotted lines, Fig. 1, and the ring 13 can be removed, after which the plate and the knife can be detached and, if necessary, the feed screw can also be removed from the casing.

In order to prevent the yoke from dropping past the horizontal position, we provide the bearing 17 with a lip 24 which acts as a stop for the yoke, so that, when the yoke is turned down onto the lip, the screw can be turned so as to engage the bearing 17 and force the ring 13 into operative position.

In Figs. 1 and 2, we have shown the yoke connected to the casing by spreading the arms of the yoke, but in Fig. 5, we have illustrated a slotted bearing 20ª for the reception of the ends of the yoke 19 so that when the yoke is released it can be entirely detached from the casing.

In Fig. 7, we have shown a construction in which the yoke 19ª can be snapped into position; one recess being of a greater depth than the other. By this construction the yoke can be removed from the casing when desired.

In Fig. 5, we have shown the hood 16ª in the form of an open frame which carries the bearing 17ª for the confining screw. This hood may extend any distance from the perforated plate, according to the type of chopper to which the invention is applied.

In Fig. 8, we have illustrated a modification, in which the screw is dispensed with, the bearing 17ᵇ is slightly beveled and the yoke 19ª has a beveled portion resting against the bearing. In this figure the pin 25, for holding the perforated plate 10 from turning, is carried by the hood 16ᵇ.

While we have illustrated our invention as applied to a chopper rotated by a handle, it can be used in connection with a power chopper as well.

By providing the lugs 15 on the ring 13 the lost motion of the parts, due to wear, can be taken up to a greater extent than where the ordinary screw ring is used without lugs, as the perforated plate can be forced into the casing beyond the outer end thereof.

By using the above described clamping device, the large screw thread is entirely dispensed with and the parts can be properly cleaned and there are no fine grooves near the perforated plate in which fecal matter will be retained. Furthermore all parts of the chopper can be tinned so as to prevent rusting.

Thus it will be seen that we provide a construction in which the parts can be quickly removed for cleaning or other purpose and the material, as it passes through the perforations of the plate, is directed onto a receptacle below the end of the chopper.

We claim—

1. The combination in a chopper, of a casing; a perforated plate loosely mounted at the end of the casing; a knife within the casing and bearing against the plate; means for feeding material to the plate; a flanged ring fitting on the casing and bearing upon the perforated plate; and a yoke extending across the end of the casing and pivoted thereto and arranged to engage the ring so as to retain the plate in position.

2. The combination in a chopper, of a casing; a perforated plate mounted in the end of the casing; a knife within the casing and arranged to bear against the plate; a feed screw carrying the knife and arranged to force material against the plate; a ring mounted at the end of the chopper and having a flange bearing against the plate; a hood on the ring; and a yoke pivoted to the casing and arranged to bear against the outer end of the hood of the ring so as to retain the perforated plate in position.

3. The combination in a chopper, of a casing; a perforated plate mounted at the end of the casing; a feed screw within the casing; a knife carried by the feed screw and bearing against the perforated plate; a ring mounted at the end of the casing and bearing against the perforated plate; a hood projecting from the ring for directing material downward as it passes through the plate; a yoke pivoted to the casing and extending over the hood, said hood having a bearing; and a screw on the yoke in line with the bearing so as to fasten the ring and plate in position.

4. The combination in a casing, of a perforated plate mounted at the end of the casing; a screw within the casing; a knife carried by the screw; a ring having a flange bearing against the outer surface of the perforated plate, said ring having a hood carrying a bearing at its outer end; a lip under the bearing; and a yoke pivotally mounted on the casing extending over the ring and its hood and resting on the lip and having a screw bearing against the end of the hood so as to secure the ring and the perforated plate to the casing.

In testimony whereof, we have signed our names to this specification, in the presence of two subscribing witnesses.

JOSEPH PEOPLES, Sr.
WILLIAM T. CLARK.

Witnesses:
Wm. E. Shupe,
Wm. A. Barr.